(12) United States Patent
Li

(10) Patent No.: US 6,947,280 B2
(45) Date of Patent: Sep. 20, 2005

(54) COMPUTER HOUSING WITH A DISC STORAGE DEVICE

(75) Inventor: Chao-Kang Li, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 191 days.

(21) Appl. No.: 10/668,425

(22) Filed: Sep. 23, 2003

(65) Prior Publication Data

US 2004/0174672 A1 Sep. 9, 2004

(30) Foreign Application Priority Data

Mar. 4, 2003 (TW) ........................................ 92203254 U

(51) Int. Cl.⁷ ................................................. G06F 1/16
(52) U.S. Cl. ..................... 361/685; 312/223.2; D14/319
(58) Field of Search ................. 361/685, 683, 361/724–727; 312/223.1, 223.2; D14/348, 353, 319

(56) References Cited

U.S. PATENT DOCUMENTS

| | | | | |
|---|---|---|---|---|
| 4,853,807 A | * | 8/1989 | Trager ..................... 360/97.01 |
| 5,355,357 A | * | 10/1994 | Yamamori et al. ......... D14/319 |
| 6,049,452 A | * | 4/2000 | You et al. ................... 361/685 |
| 6,272,008 B1 | * | 8/2001 | Huang ........................ 361/683 |
| 6,377,446 B1 | * | 4/2002 | Liau ........................... 361/683 |
| 6,407,910 B1 | * | 6/2002 | Diaz et al. .................. 361/683 |

* cited by examiner

Primary Examiner—Lisa Lea-Edmonds
(74) Attorney, Agent, or Firm—Merchant & Gould P.C.

(57) ABSTRACT

A computer housing includes a disc storage device mounted detachably on a top surface of a housing body. The disc storage device includes a casing formed with a receiving recess for receiving an optical disc, a cover body connected pivotally to the casing and operable so as to move from a closed position to an open position, a biasing member disposed between the casing and the cover body for biasing the cover body to move from the closed position to the open position, and a releasable retaining member disposed on the casing and the cover body for retaining the cover body at the closed position. An engaging unit is disposed on a lower side of the casing of the disc storage device and the top surface of the housing body for detachable engagement between the housing body and the casing of the disc storage device.

5 Claims, 5 Drawing Sheets

COMPUTER HOUSING WITH A DISC STORAGE DEVICE

CROSS-REFERENCE TO RELATED APPLICATION

This application claims priority of Taiwanese Application No. 092203254, filed on Mar. 4, 2003.

BACKGROUND OF THE INVENTION

1. Field of the Invention

The invention relates to a computer housing, more particularly to a computer housing with a disc storage device.

2. Description of the Related Art

FIGS. 1 and 2 illustrate a conventional computer housing 1 capable of storing an optical disc 13. The conventional computer housing 1 includes a housing body 12 having a top surface 121, a disc-supporting base 111 mounted on the top surface 121 for supporting and receiving the optical disc 13 thereon and provided with an upright positioning rod 112 extending through a through hole 131 in the optical disc 13, and a cover body 113 mounted slidably on the top surface 121 of the housing body 12. The cover body 113 is operable so as to move from a closed position, where the cover body 113 covers the disc-supporting base 111 (see FIG. 1), to an open position, where the cover body 113 uncovers the disc-supporting base 111 (see FIG. 2).

It is noted that the disc-supporting base 111 is screwed on the top surface 121 of the housing body 12 and is formed with sliding grooves 114 for slidable engagement with the cover body 113, thereby resulting in a relatively complicated assembly. Moreover, during operation, the cover body 113 must be moved away from the disc-supporting base 111 so as to fully expose the disc-supporting base 111, thereby resulting in inconvenience during use.

FIGS. 3 and 4 illustrate another conventional computer housing 2 capable of storing at least one optical disc 23. The conventional computer housing 2 includes a housing body 22 having a front surface 221 that is formed with a disc-receiving recess 211 for receiving the optical disc 23, and a cover body 213. The disc-receiving recess 211 has an open front end 2111, and a positioning rod 212 extending frontwardly from a bottom wall of the disc-receiving recess 211 to extend through a through hole in the optical disc 23. The cover body 213 has a lower end connected pivotally to the front surface 221 of the housing body 22 and is operable so as to move from a closed position, where the cover body 213 covers the disc-receiving recess 211 (see FIG. 3), to an open position, where the cover body 213 uncovers the disc-receiving recess 211 (see FIG. 4).

However, due to the design that the optical disc 23 is sleeved uprightly on the positioning rod 212, if a plurality of the optical discs 23 are received in the disc-receiving recess 211, slippage of the optical discs 23 from the positioning rod 212 may occur when the cover body 213 is moved from the closed position to the open position.

SUMMARY OF THE INVENTION

Therefore, the object of the present invention is to provide a computer housing with a disc storage device that can be easily assembled thereto.

According to the present invention, there is provided a computer housing with a disc storage device. The computer housing comprises:

a housing body having a top surface;

a disc storage device mounted detachably on the top surface of the housing body and including a casing having upper and lower sides, the upper side being formed with a receiving recess adapted for receiving an optical disc, the receiving recess having an open top end, a cover body connected pivotally to the upper side of the casing and operable so as to move from a closed position, where the cover body closes the open top end of the receiving recess, to an open position, where the cover body uncovers the open top end of the receiving recess, a biasing member disposed between the casing and the cover body for biasing the cover body to move from the closed position to the open position, and a releasable retaining member disposed on the casing and the cover body for retaining the cover body at the closed position; and an engaging unit disposed on the lower side of the casing of the disc storage device and the top surface of the housing body for detachable engagement between the housing body and the casing of the disc storage device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
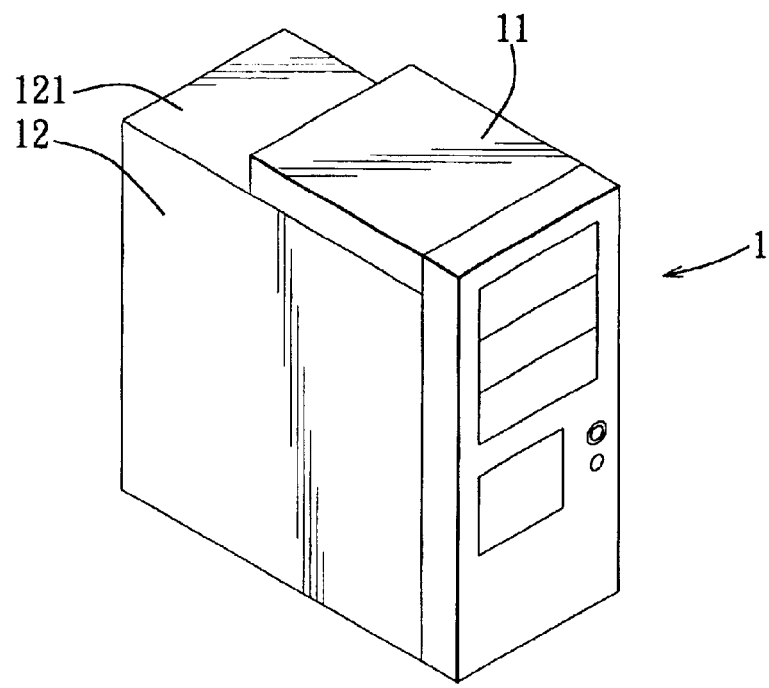
FIG. 1 is a perspective view of a conventional computer housing capable of storing an optical disc.
Figure 2:
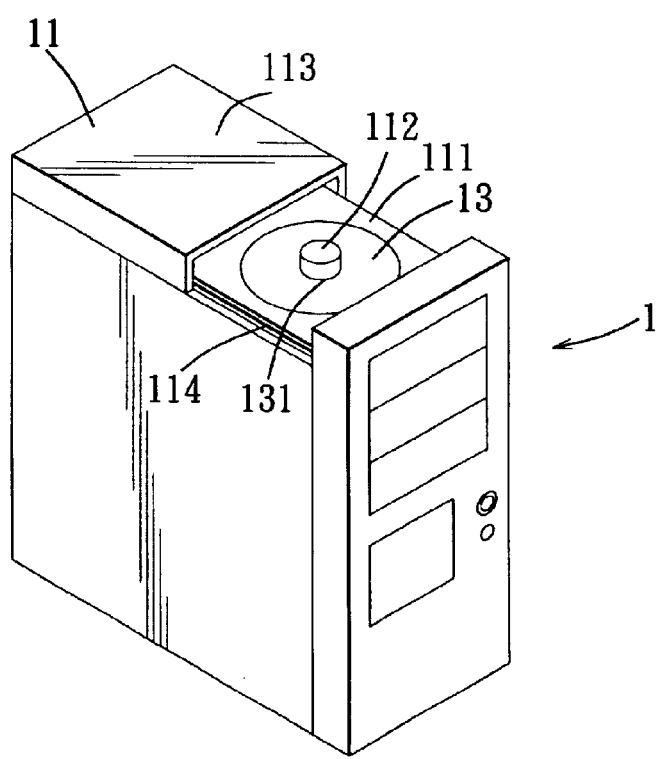
FIG. 2 is a perspective view showing the conventional computer housing of FIG. 1 in a state for loading and unloading the optical disc.
Figure 3:
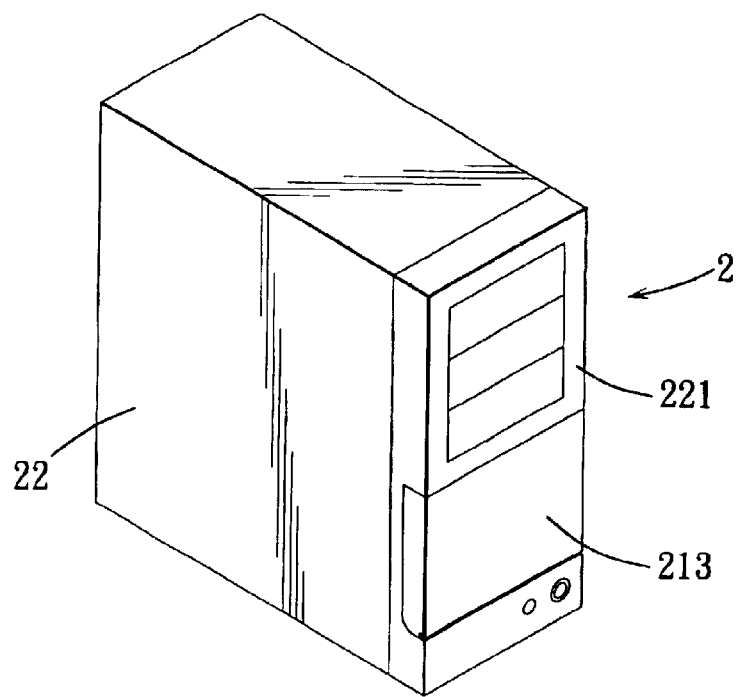
FIG. 3 is a perspective view of another conventional computer housing capable of storing an optical disc.
Figure 4:
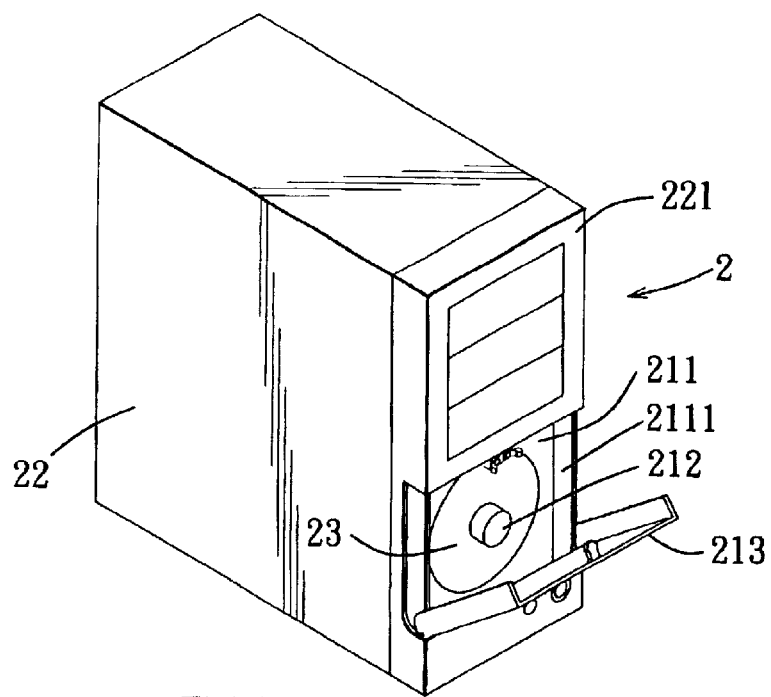
FIG. 4 is a perspective view showing the conventional computer housing of FIG. 3 in a state for loading and unloading the optical disc.
Figure 5:
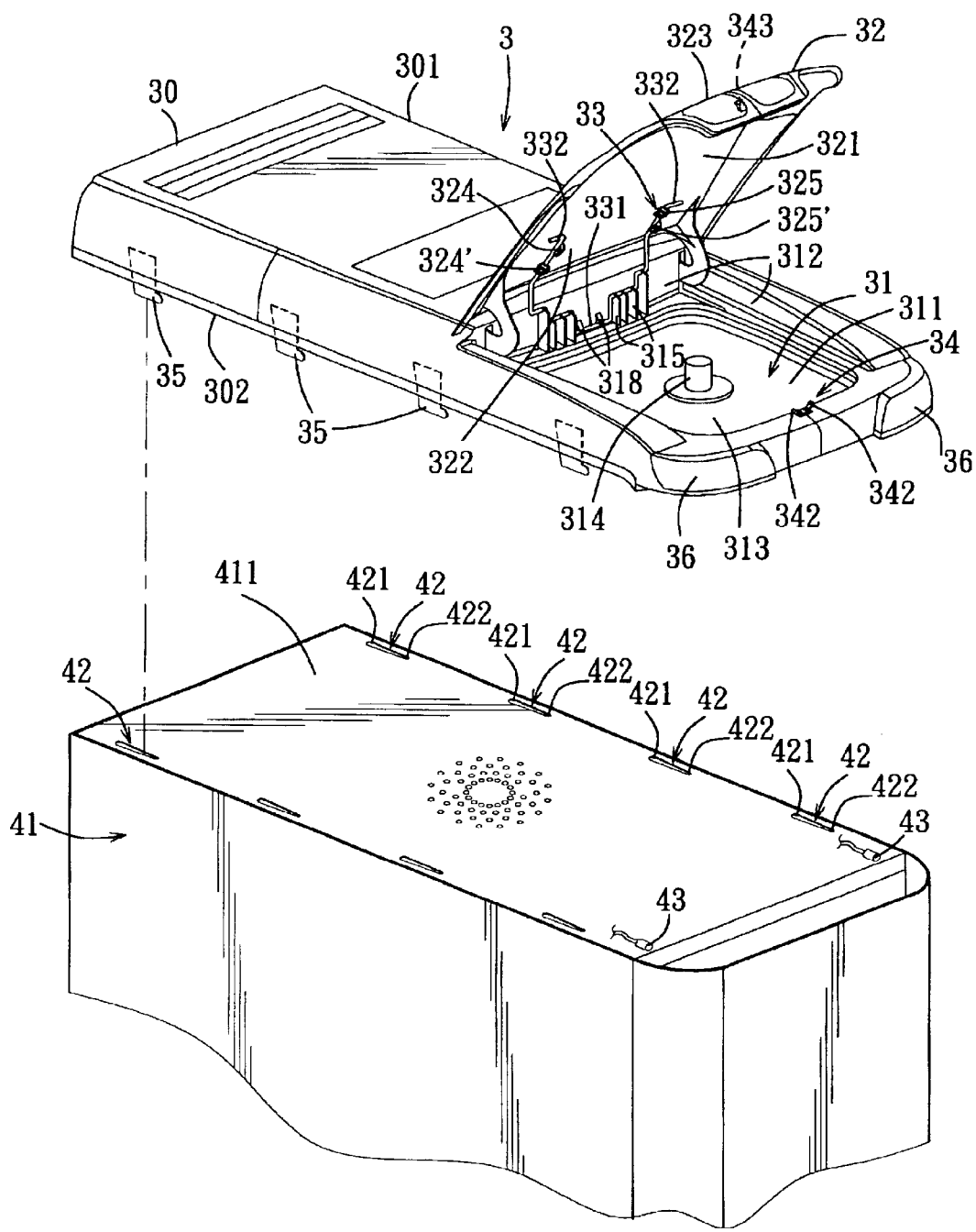
FIG. 5 is a fragmentary exploded perspective view showing the preferred embodiment of a computer housing with a disc storage device according to the present invention.
Figure 6:
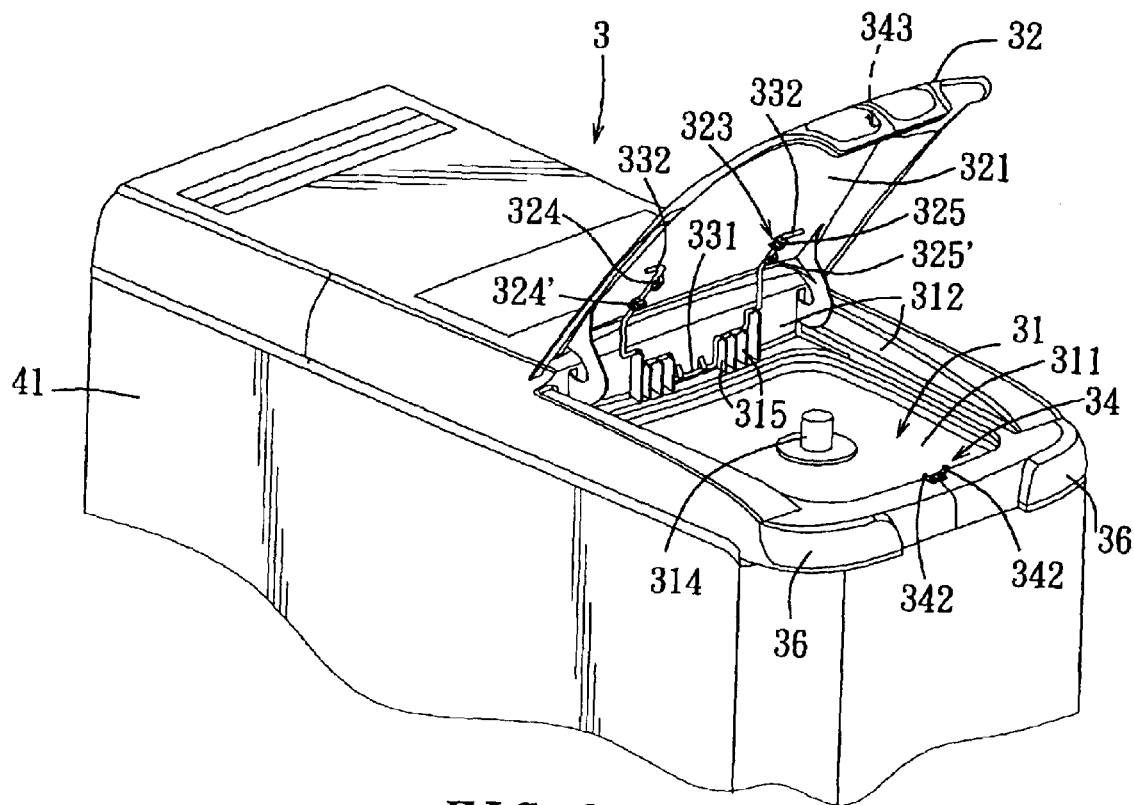
FIG. 6 is a fragmentary perspective view showing the preferred embodiment when a cover body of the disk storage device is at an open position.

Referring to FIGS. 5 and 6, the preferred embodiment of a computer housing according to the present invention is shown to include a housing body 41, a disc storage device 3, and an engaging unit.

The housing body 41 has a top surface 411.

The disc storage device 3 is mounted detachably on the top surface 411 of the housing body 41 and includes a casing 30, a cover body 32, a biasing member 33, a positioning unit, and a releasable retaining member 34.

The casing 30 has upper and lower sides 301, 302. The upper side 301 is formed with a receiving recess 31 adapted for receiving a plurality of optical discs (not shown). The receiving recess 31 has an open top end 313. In this embodiment, the receiving recess 31 has a bottom wall 311, an upright surrounding wall 312 extending from a periphery of the bottom wall 311, and a positioning rod 314 extending upwardly from the bottom wall 311. The positioning rod 314 is adapted to extend through a through hole in the optical disc (not shown).

Figure 8:
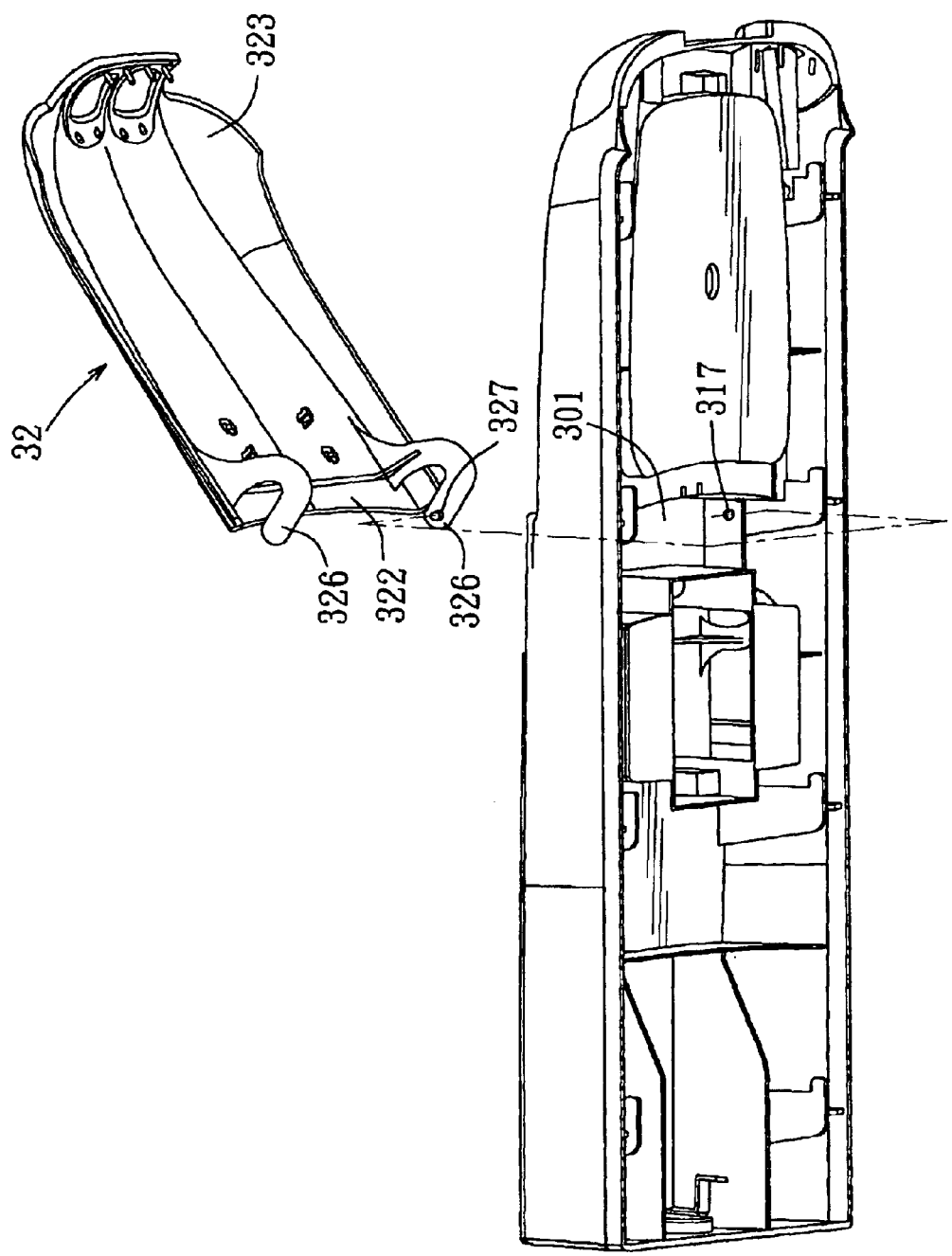
FIG. 8 is an exploded perspective showing the disc storage device of the preferred embodiment.

The cover body 32 is connected pivotally to the upper side 301 of the casing 30 and is operable so as to move from a closed position, where the cover body 32 closes the open top end 313 of the receiving recess 31, to an open position, where the cover body 32 uncovers the open top end 313 of the receiving recess 31 (see FIG. 5). With reference to FIG. 8, in this embodiment, the cover body 32 has a connecting end 322 provided with a pair of connecting pieces 326, each of which extends through a through hole formed in the surrounding wall 312 and is formed with a pivot post 327 that engages pivotally a pivot hole 317 formed in the upper side 301 of the casing 30, and a free end 323 opposite to the connecting end 322.

Referring again to FIGS. 5 and 6, the retaining member 34, such as a known touch-actuated switch, is disposed on the casing 30 and the cover body 32 for retaining the cover body 32 at the closed position. In this embodiment, the retaining member 34 includes an actuator 343 provided on the free end 323 of the cover body 30, and a pair of clamping pieces 342 mounted on the upper side 301 of the casing 30 and disposed adjacent to the receiving recess 31. When the cover body 32 is disposed at the closed position, the actuator 343 is clamped by the clamping pieces 342. Subsequently, when the free end 323 of the cover body 30 is pressed, the clamping pieces 342 release the actuator 343 from engagement therewith, thereby permitting movement of the cover body 30 from the closed position to the open position. Since the engagement between the actuator 343 and the clamping pieces 342 is known in the art, a detailed description of the same is dispensed with herein for the sake of brevity.

The biasing member 33 is disposed between the casing 30 and the cover body 32 for biasing the cover body 32 to move from the closed position to the open position. In this embodiment, the biasing member 33 has opposite end portions 332 that are positioned on an inner surface 321 of the cover body 32, and an intermediate portion 331 that interconnects the end portions 332 and that is positioned on the surrounding wall 312 of the receiving recess 31. The biasing member 33 provides a restoration force so as to bias the cover body 32 to move from the closed position to the open position when the actuator 343 on the cover body 32 is released by the clamping pieces 342 of the retaining member 34.

Figure 7:
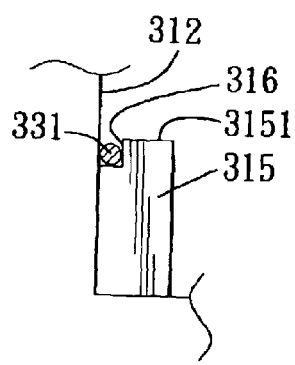
FIG. 7 is a fragmentary schematic view illustrating how an intermediate portion of a biasing member plate portion is positioned in a positioning groove.

The positioning unit includes a plurality of positioning lugs 324, 324', 325, 325' formed on the inner surface 321 of the cover body 32 for positioning the end portions 332 of the biasing member 33 on the cover body 32, a plurality of parallel plate portions 315 disposed in the receiving recess 31 and mounted on the surrounding wall 312, each of which has a notched upper end 3151 that cooperates with the surrounding wall 312 so as to confine a positioning groove 316 for positioning the intermediate portion 331 of the biasing member 33 therein, as best shown in FIG. 7, and two positioning stubs 318 formed on the surrounding wall 312 and disposed above and abutting against the intermediate portion 331 of the biasing member 33 to prevent the intermediate portion 331 of the biasing member 33 from moving upwardly and away from the positioning grooves 316.

The engaging unit is disposed on the lower side of the casing 30 of the disc storage device 3 and the top surface 411 of the housing body 41 for detachable engagement between the housing body 41 and the casing 30 of the disc storage device 3. In this embodiment, the engaging unit includes a plurality of engaging slots 42, each of which is formed through the top surface 411 of the housing body 41 and has a wider end portion 421, and a narrower end portion 422 opposite to the wider end portion 421, and a plurality of L-shaped engaging plates 35 extending downwardly from the lower side 302 of the casing 30 (see FIG. 5). Each of the engaging plates 35 extends through a corresponding one of the engaging slots 42 at the wider end portion 421, and is moved toward and retained in the narrower end portion 422 to mount detachably the disc storage device 3 on the housing body 41.

It is noted that, due to the presence of the engaging unit, the disc storage device 3 can be easily assembled to the housing body 41. Furthermore, the disc storage device 3 can be used independently.

Moreover, in this embodiment, the disc storage device 3 is in the shape of an automobile. The casing 30 of the disc storage device 3 further has two lens portions 36 disposed at corners and adjacent to the receiving recess 31. Two lamps 43 are provided on the top surface 411 of the housing body 41 and are located proximate to the lens portions 36. The arrangement as such simulates conventional headlights and provides illuminating as well as decorative effects.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer housing comprising:
a housing body having a top surface;
a disc storage device mounted detachably on said top surface of said housing body and including
a casing having upper and lower sides, said upper side being formed with a receiving recess adapted for receiving an optical disc, said receiving recess having an open top end,
a cover body connected pivotally to said upper side of said casing and operable so as to move from a closed position, where said cover body closes said open top end of said receiving recess, to an open position, where said cover body uncovers said open top end of said receiving recess,
a biasing member disposed between said casing and said cover body for biasing said cover body to move from the closed position to the open position, and
a releasable retaining member disposed on said casing and said cover body for retaining said cover body at the closed position; and
an engaging unit disposed on said lower side of said casing of said disc storage device and said top surface of said housing body for detachable engagement between said housing body and said casing of said disc storage device.

2. The computer housing as claimed in claim 1, wherein said receiving recess has a bottom wall, an upright surrounding wall extending from a periphery of said bottom wall, and a positioning rod extending upwardly from said bottom wall, said positioning rod being adapted to extend through a through hole in the optical disc.

3. The computer housing as claimed in claim 2, wherein said biasing member has opposite end portions that are positioned on said cover body, and an intermediate portion that interconnects said end portions and that is positioned on said surrounding wall of said receiving recess, said biasing member providing a restoration force so as to bias said cover body to move from the closed position to the open position when said cover body is released by said retaining member.

4. The computer housing as claimed in claim 3, wherein said disc storage device further includes a positioning unit for positioning said biasing member, said positioning unit including a plurality of positioning lugs formed on said cover body for positioning said end portions of said biasing member on said cover body;

a plurality of parallel plate portions mounted on said surrounding wall, each of said plate portions having a notched upper end that cooperates with said surrounding wall so as to confine a positioning groove for positioning said intermediate portion of said biasing member therein; and a positioning stub formed on said surrounding wall and disposed above and abutting against said intermediate portion of said biasing member to prevent said intermediate portion of said biasing member from moving upwardly and away from said positioning grooves.

5. The computer housing as claimed in claim 1, wherein said engaging unit includes an engaging slot formed through said top surface of said housing body and having a wider end portion and a narrower end portion opposite to said wider end portion, and an L-shaped engaging plate extending downwardly from said lower side of said casing, said engaging plate extending through said engaging slot at said wider end portion and being moved toward and retained in said narrower end portion to mount detachably said disc storage device on said housing body.

* * * * *